United States Patent
Luo et al.

(10) Patent No.: US 8,437,380 B2
(45) Date of Patent: *May 7, 2013

(54) CHANNEL ESTIMATION FOR WIRELESS COMMUNICATION

(75) Inventors: Tao Luo, San Diego, CA (US); Aleksandar Damnjanovic, San Diego, CA (US); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 12/902,992

(22) Filed: Oct. 12, 2010

(65) Prior Publication Data

US 2011/0026653 A1 Feb. 3, 2011

Related U.S. Application Data

(63) Continuation of application No. 11/492,605, filed on Jul. 24, 2006, now Pat. No. 8,165,186.

(60) Provisional application No. 60/707,673, filed on Aug. 12, 2005.

(51) Int. Cl.
*H04B 1/69* (2011.01)
*H04B 1/707* (2011.01)
*H04B 1/713* (2011.01)

(52) U.S. Cl.
USPC ........... 375/148; 375/150; 375/143; 375/144; 375/346; 375/349; 455/522; 370/320

(58) Field of Classification Search ............... 375/148, 375/150, 142, 144, 346, 349; 455/522; 370/320
See application file for complete search history.

(56) References Cited

U.S. PATENT DOCUMENTS 5,872,816 A 2/1999 Parr et al.
6,414,988 B1 7/2002 Ling
(Continued)

FOREIGN PATENT DOCUMENTS

CN 1319289 A 10/2001
CN 1555638 12/2004
(Continued)

OTHER PUBLICATIONS

3GPP TR 25.896 v6.0.0 (Mar. 2004), 3rd Generation Partnership Project; Technical Specification Group Radio Access Network; Feasibility Study for Enhanced Uplink for UTRA FDD (Release 6).

(Continued)

*Primary Examiner* — Phuong Phu
(74) *Attorney, Agent, or Firm* — S. Hossain Beladi

(57) ABSTRACT

Techniques for deriving channel estimates with different channel estimation filters are described. In one scheme, a filter selection metric is determined for a signal to be recovered, a channel estimation filter is selected based on the filter selection metric, and a channel estimate is derived with the selected channel estimation filter. In another scheme, a first channel estimate is derived with a first channel estimation filter having a first filter response, a first signal is recovered with the first channel estimate, and interference due to the first signal is estimated and removed. A second channel estimate is derived with a second channel estimation filter having a second filter response that is different from the first filter response.

40 Claims, 11 Drawing Sheets

U.S. PATENT DOCUMENTS

| | | | |
|---|---|---|---|
| 6,937,642 B2 | 8/2005 | Hirata | |
| 6,963,546 B2 | 11/2005 | Misra et al. | |
| 7,035,659 B1 | 4/2006 | Yang | |
| 7,133,435 B2 | 11/2006 | Papasakellariou et al. | |
| 7,230,975 B2 | 6/2007 | Subrahmanya et al. | |
| 8,165,186 B2 * | 4/2012 | Luo et al. | 375/148 |
| 2002/0164967 A1 | 11/2002 | Miyoshi et al. | |
| 2003/0058962 A1 | 3/2003 | Baldwin | |
| 2003/0072277 A1 | 4/2003 | Subrahmanya et al. | |
| 2003/0142655 A1 | 7/2003 | Higuchi et al. | |
| 2010/0158176 A1 * | 6/2010 | Luo et al. | 375/350 |

FOREIGN PATENT DOCUMENTS

| | | |
|---|---|---|
| EP | 0813314 A2 | 12/1997 |
| EP | 0967734 A2 | 12/1999 |
| EP | 0986204 A1 | 3/2000 |
| EP | 1122891 A1 | 8/2001 |
| EP | 1124346 A1 | 8/2001 |
| EP | 1211819 A1 | 6/2002 |
| EP | 1229668 A2 | 8/2002 |
| EP | 1401164 | 3/2004 |
| GB | 2403113 | 12/2004 |
| JP | 2001326586 A | 11/2001 |
| JP | 2002044172 A | 2/2002 |
| JP | 2002542710 U | 12/2002 |
| JP | 2003510873 A | 3/2003 |
| JP | 2004538707 A | 12/2004 |
| WO | WO9520842 A1 | 8/1995 |
| WO | WO9960721 A1 | 11/1999 |
| WO | WO0064067 A1 | 10/2000 |
| WO | WO0122571 A1 | 3/2001 |
| WO | WO0139032 A1 | 5/2001 |
| WO | WO03015296 A1 | 2/2003 |
| WO | WO2004082172 A1 | 9/2004 |

OTHER PUBLICATIONS

3GPP TS 25.213 v6.3.0 (Jun. 2005), 3rd Generation Partnership Project; Technical Specification Group Radio Access Network; Spreading and modulation (FDD) (Release 6).

European Search Report—EP10004137, Search Authority—The Hague Patent Office, Apr. 8, 2010.

Higuchi, et al., "Experimental evaluation of combined effect of coherent RAKE combining and SIR-based fast transmit power control for reverse link of DS-CDMA mobile radio," IEEE Journal on Selected Areas in Communications, vol. 18, Issue 8, Aug. 2000, pp. 1526-1535.

International Search Report and Written Opinion—PCT/US06/031405, International Search Authority—European Patent Office, Feb. 16, 2007.

Patel, et al., "Analysis of a simple successive interference cancellation scheme in a DS/CDMA system," IEEE Journal on Selected Areas in Communications, vol. 12, Issue 5, Jun. 1994, pp. 796-807.

Taiwanese Search Report—095129608—TIPO—Sep. 4, 2009.

Viterbi, "Very low rate convolutional codes for maximum theoretical performance of spread-spectrum multiple-access channels," IEEE Journal on Selected Areas in Communications, vol. 8, Issue 4, May 1990, pp. 641-649.

\* cited by examiner

CHANNEL ESTIMATION FOR WIRELESS COMMUNICATION

CLAIM OF PRIORITY UNDER 35 U.S.C. §§119 AND 120

The present Application for Patent is a continuation of patent application Ser. No. 11/492,605 entitled "Channel Estimation for Wireless Communication", filed Jul. 24, 2006, allowed, which claims priority to patent application Ser. No. 12/717,598, entitled "Channel Estimation for Wireless Communication", filed Mar. 4, 2010, and Provisional Application No. 60/707,673, entitled "SNR Sensitive Channel Estimation for Advanced Receivers," filed Aug. 12, 2005, and assigned to the assignee hereof, and expressly incorporated herein by reference.

BACKGROUND

1. Field

The present disclosure relates generally to communication, and more specifically to techniques for performing channel estimation.

2. Background

In a wireless communication system, a transmitter typically processes (e.g., encodes and modulates) traffic data to generate data symbols. In a coherent system, the transmitter multiplexes pilot symbols with the data symbols, processes the multiplexed data and pilot symbols to generate a modulated signal, and transmits the modulated signal via a wireless channel. The wireless channel distorts the transmitted signal with a channel response and further degrades the signal with noise and interference.

A receiver receives the transmitted signal and processes the received signal to obtain input samples. For coherent data detection, the receiver estimates the response of the wireless channel based on received pilot symbols and derives a channel estimate. The receiver then performs data detection on the input samples with the channel estimate to obtain detected symbols, which are estimates of the data symbols sent by the transmitter. The receiver then processes (e.g., demodulates and decodes) the detected symbols to obtain decoded data.

The quality of the channel estimate may have a large impact on data detection performance and may affect the quality of the detected symbols as well as the reliability of the decoded data. There is therefore a need in the art for techniques to derive a high quality channel estimate for wireless communication.

SUMMARY

Techniques for deriving channel estimates with different channel estimation filters are described herein. According to an exemplary embodiment, an apparatus is described which includes at least one processor and a memory. The processor(s) determine a filter selection metric for a signal to be recovered, select a channel estimation filter based on the filter selection metric, and derive a channel estimate with the selected channel estimation filter.

According to another exemplary embodiment, an apparatus is described which includes at least one processor and a memory. The processor(s) derive a first channel estimate based on pilot symbols and with a first channel estimation filter. The processor(s) recover a first packet with the first channel estimate and regenerate data symbols for the first packet. The processor(s) derive a second channel estimate based on the data symbols and with a second channel estimation filter, and obtains a third channel estimate based on the first and second channel estimates.

According to yet another exemplary embodiment, an apparatus is described which includes at least one processor and a memory. The processor(s) derive a first channel estimate with a first channel estimation filter having a first filter response, recover a first signal with the first channel estimate, and estimate and remove interference due to the first signal. The processor(s) derive a second channel estimate with a second channel estimation filter having a second filter response that is different from the first filter response.

Various aspects and exemplary embodiments of the invention are described in further detail below.

DETAILED DESCRIPTION

The word "exemplary" is used herein to mean "serving as an example, instance, or illustration." Any exemplary embodiment described herein as "exemplary" is not necessarily to be construed as preferred or advantageous over other exemplary embodiments.

Figure 1:
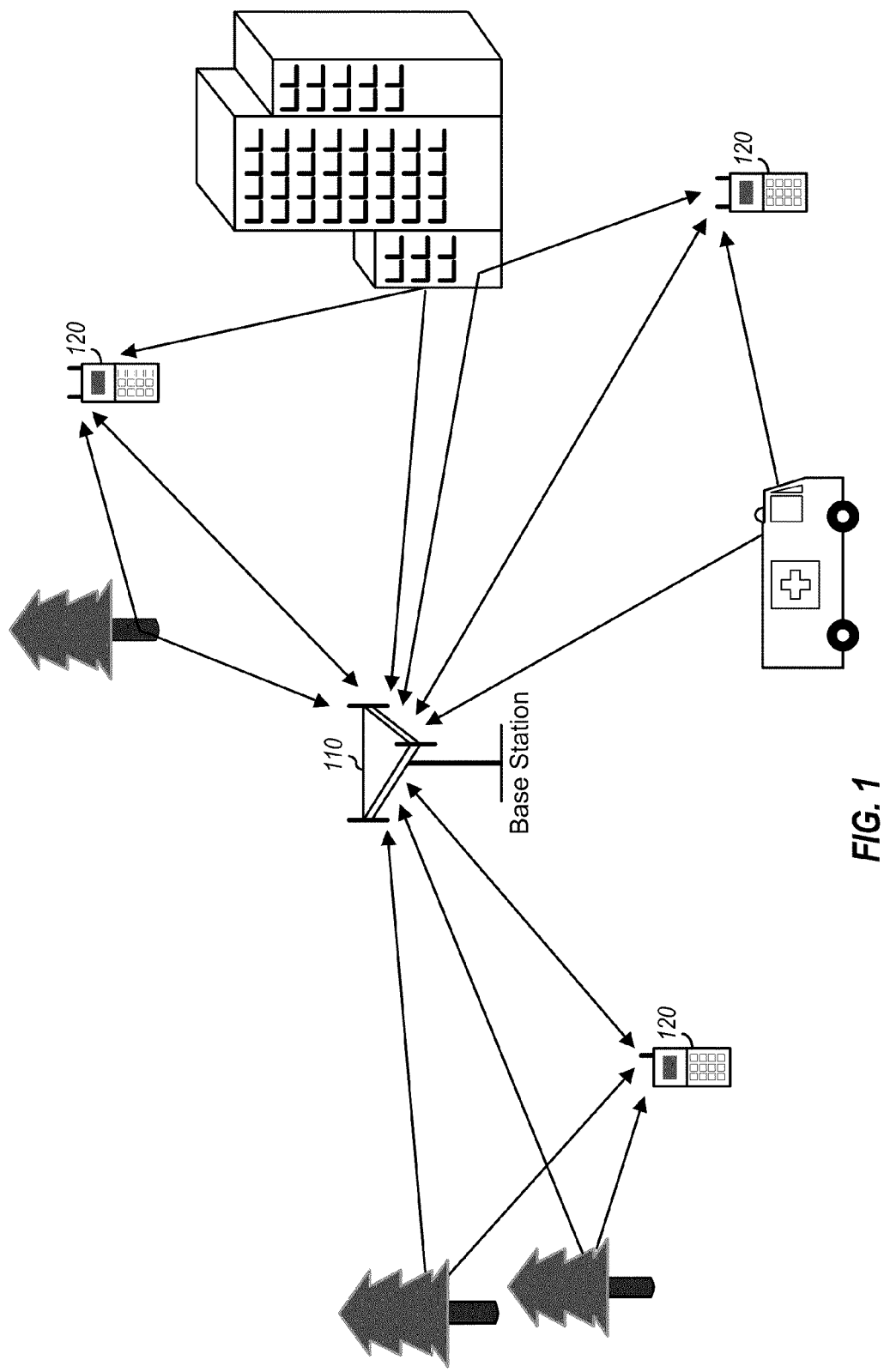
FIG. 1 shows a wireless communication system.

FIG. 1 shows a wireless communication system 100. For simplicity, FIG. 1 shows only one base station 110 and three terminals 120. A base station is generally a fixed station that communicates with the terminals and may also be called a Node B, an access point, a base transceiver station (BTS), or some other terminology. A base station may communicate with one or more terminals on the downlink and uplink. The downlink (or forward link) refers to the communication link from the base station to the terminals, and the uplink (or reverse link) refers to the communication link from the terminals to the base station.

A terminal may be stationary or mobile and may also be called a user equipment (UE), a mobile station, a user terminal, a subscriber unit, or some other terminology. A terminal may be a cellular phone, a personal digital assistant (PDA), a wireless device, a wireless modem card, a handheld device, or some other device or apparatus. In the following description, the terms "terminal" and "user" are used interchangeably.

On the downlink, base station 110 may transmit one or more downlink signals to terminals 120. Each downlink signal may reach each terminal 120 via one or more signal paths, which may include a direct path and/or reflected paths. The reflected paths are created by reflections of radio waves due to obstructions (e.g., buildings, trees, vehicles, and other structures) in the wireless environment. Each terminal 120 may receive multiple instances or copies of each downlink signal. Each received signal instance is obtained via a different signal path and has a particular complex gain and a particular time delay determined by that signal path. The received signal at each terminal 120 is a superposition of all received signal instances for base station 110.

On the uplink, each terminal 120 may transmit one or more uplink signals to base station 110. Each uplink signal may reach base station 110 via one or more signal paths. The received signal at base station 110 is a superposition of all received signal instances for all terminals transmitting on the uplink.

The channel estimation techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, and so on. A CDMA system may implement a radio technology such as cdma2000, Universal Terrestrial Radio Access (UTRA) Frequency Division Duplexing (FDD), or UTRA Time Division Duplexing (TDD). cdma2000 covers IS-2000, IS-95 and IS-856 standards. UTRA FDD is also referred to as Wideband-CDMA (W-CDMA). A TDMA system may implement a radio technology such as Global System for Mobile Communications (GSM). These various radio technologies and standards are known in the art. UTRA FDD, UTRA TDD, and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

The channel estimation techniques may be used for downlink and uplink transmissions and may be implemented at a base station as well as a terminal. For clarity, the techniques are described below for uplink transmission in W-CDMA.

Figure 2:
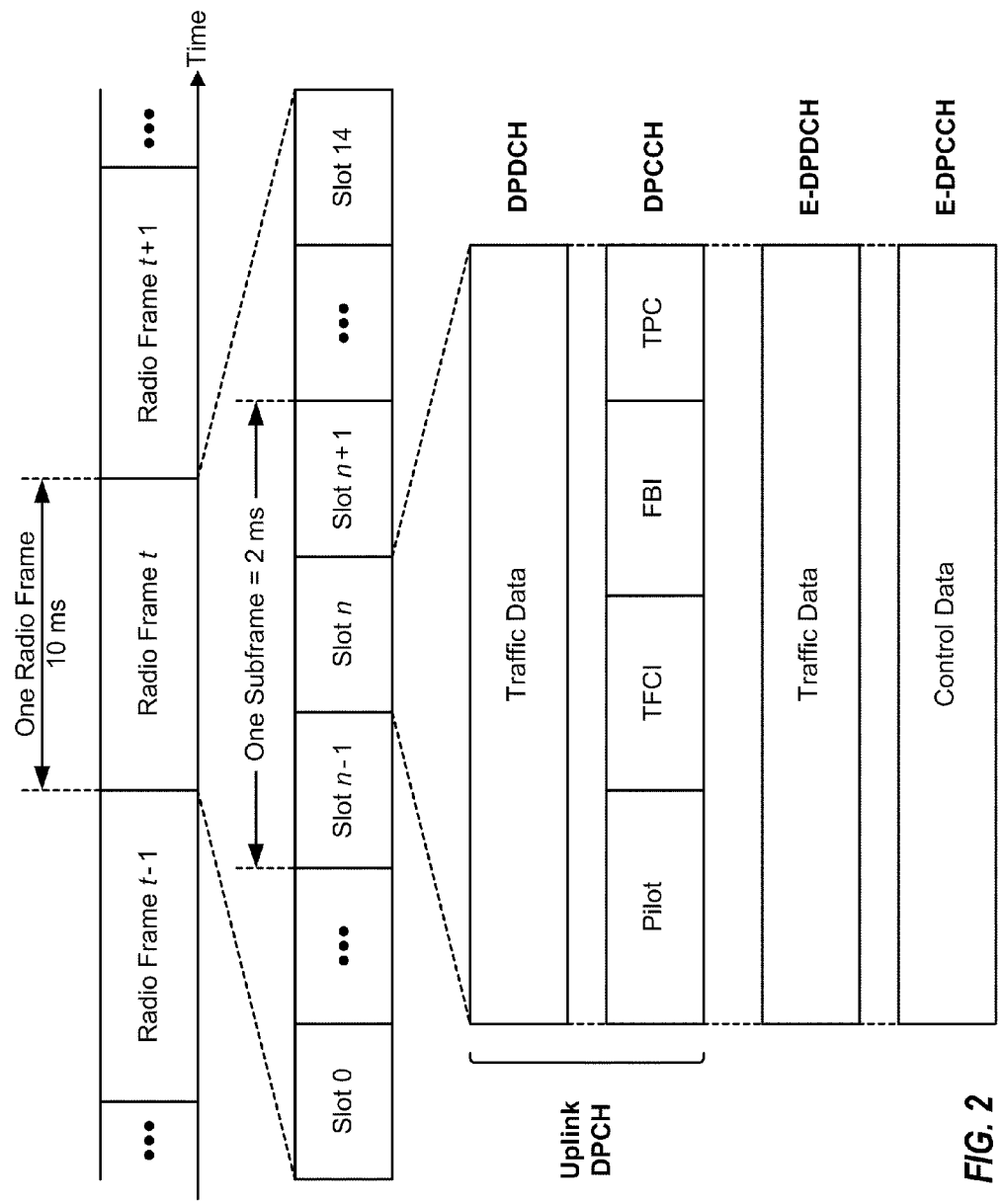
FIG. 2 shows a frame format and a slot format in W-CDMA.

FIG. 2 shows a frame format in W-CDMA. The timeline for transmission is divided into radio frames. Each radio frame has a duration of 10 milliseconds (ms) and is identified by a 12-bit system frame number (SFN). Each radio frame is further partitioned into 15 slots, which are labeled as slot 0 through slot 14. Each slot has a duration of 0.667 ms and includes 2560 chips at 3.84 Mcps. Each ratio frame is also partitioned into five subframes. Each subframe has a duration of 2 ms and includes 3 slots.

FIG. 2 also shows a slot format for an uplink dedicated physical channel (DPCH) used by a terminal to send traffic and other data on the uplink. The uplink DPCH includes a dedicated physical data channel (DPDCH) that carries traffic data and a dedicated physical control channel (DPCCH) that carries pilot and control data. A radio link for a terminal may include zero, one, or multiple DPDCHs and only one DPCCH.

Each slot of the DPCCH includes a pilot field, a transport format combination indicator (TFCI) field, a feedback information (FBI) field, and a transmit power control (TPC) field. The pilot field carries pilot symbols. The TFCI field carries format information used to recover the traffic data. The FBI field carries feedback from a terminal to a base station, e.g., for transmit diversity. The TPC field carries power control information to direct the base station to adjusts its transmit power for downlink transmission to the terminal. The number of bits in each field is zero or greater and is determined by a slot format selected for use.

FIG. 2 also shows a slot format for an E-DCH DPDCH (E-DPDCH) that carries traffic data and an E-DCH DPCCH (E-DPCCH) that carries control data. A radio link for a terminal may include zero, one, or multiple E-DPDCHs and at most one E-DPCCH.

Figure 3:
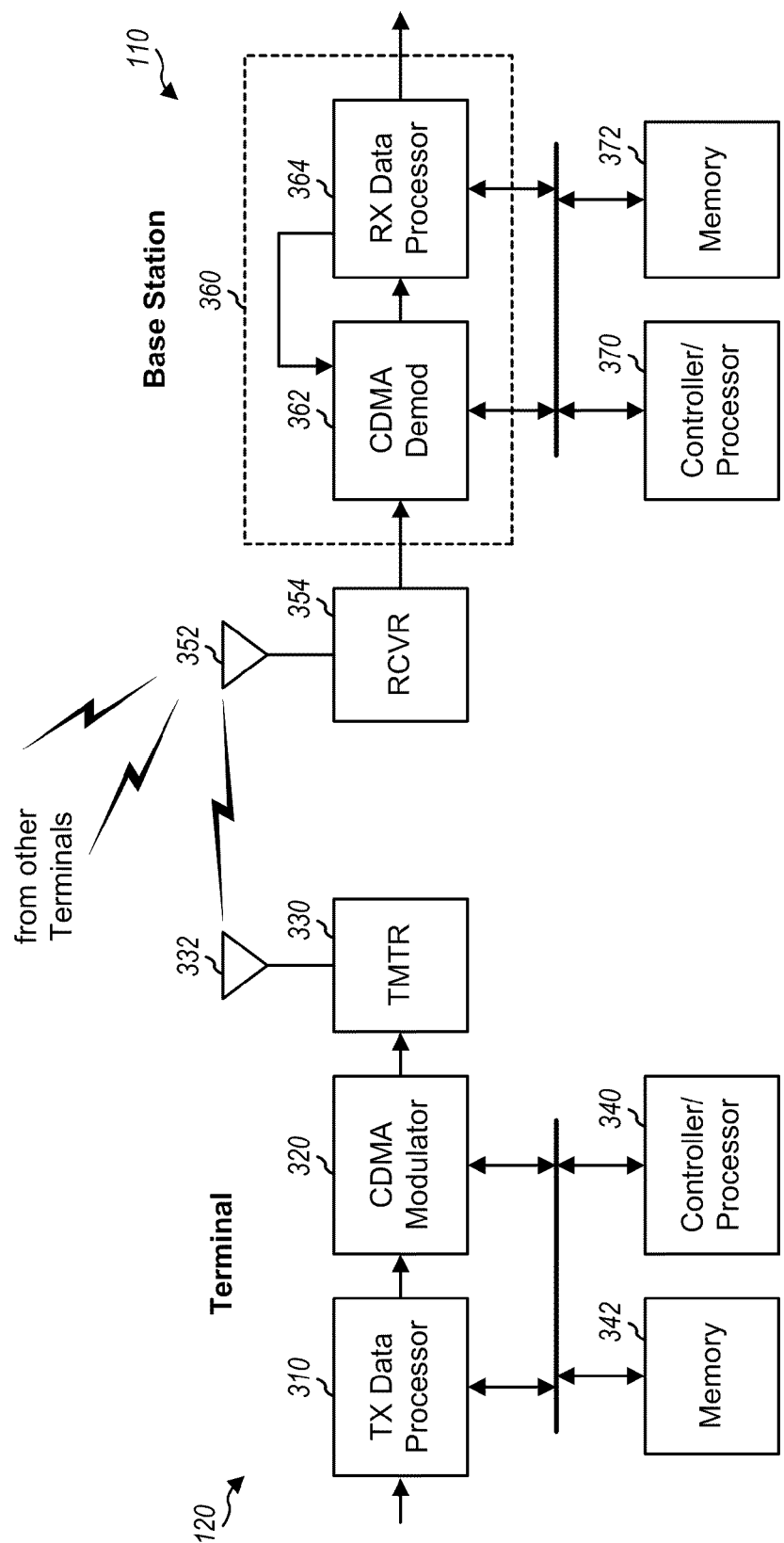
FIG. 3 shows a block diagram of a base station and a terminal

FIG. 3 shows a block diagram of base station 110 and terminal 120, which is one of the terminals in FIG. 1. At terminal 120, a transmit (TX) data processor 310 receives data packets, processes (e.g., encodes, interleaves, and symbol maps) each packet, and generates data symbols. A packet may also be referred to as a transport block, a frame, and so on. A data symbol is a symbol for data, a pilot symbol is a symbol for pilot, and pilot is data that is known a priori by both the terminal and base station. The data and pilot symbols may be modulation symbols from a signal constellation for PSK, QAM, or some other modulation scheme. TX data processor 310 also appends a cyclic redundancy check (CRC) value to each packet, which is used to determine whether the packet is decoded correctly or in error. A CDMA modulator 320 processes the data symbols and pilot symbols and provides output chips to a transmitter (TMTR) 330. Transmitter 330 processes (e.g., converts to analog, amplifies, filters, and frequency upconverts) the output chips and generates an uplink signal, which is transmitted from an antenna 332.

At base station 110, an antenna 352 receives the uplink signals from terminal 120 as well as other terminals via direct and/or reflected paths. Antenna 352 provides a received signal to a receiver (RCVR) 354. Receiver 354 processes (e.g., filters, amplifies, frequency downconverts, and digitizes) the received signal and provides input samples to an RX processor 360. Within RX processor 360, a CDMA demodulator (Demod) 362 processes the input samples and provides detected symbols, which are estimates of the data symbols sent by terminal 120. CDMA demodulator 362 may implement a rake receiver and/or an equalizer, each of which can combine energy from multiple signal paths. An RX data processor 364 processes (e.g., symbol demaps, deinterleaves, and decodes) the detected symbols and provides decoded data. In general, the processing by CDMA demodulator 362 and RX data processor 364 is complementary to the processing by CDMA modulator 320 and TX data processor 310, respectively, at terminal 120.

Controllers/processors 340 and 370 direct operation of various processing units at terminal 120 and base station 110, respectively. Memories 342 and 372 store data and program codes for terminal 120 and base station 110, respectively.

Figure 4:
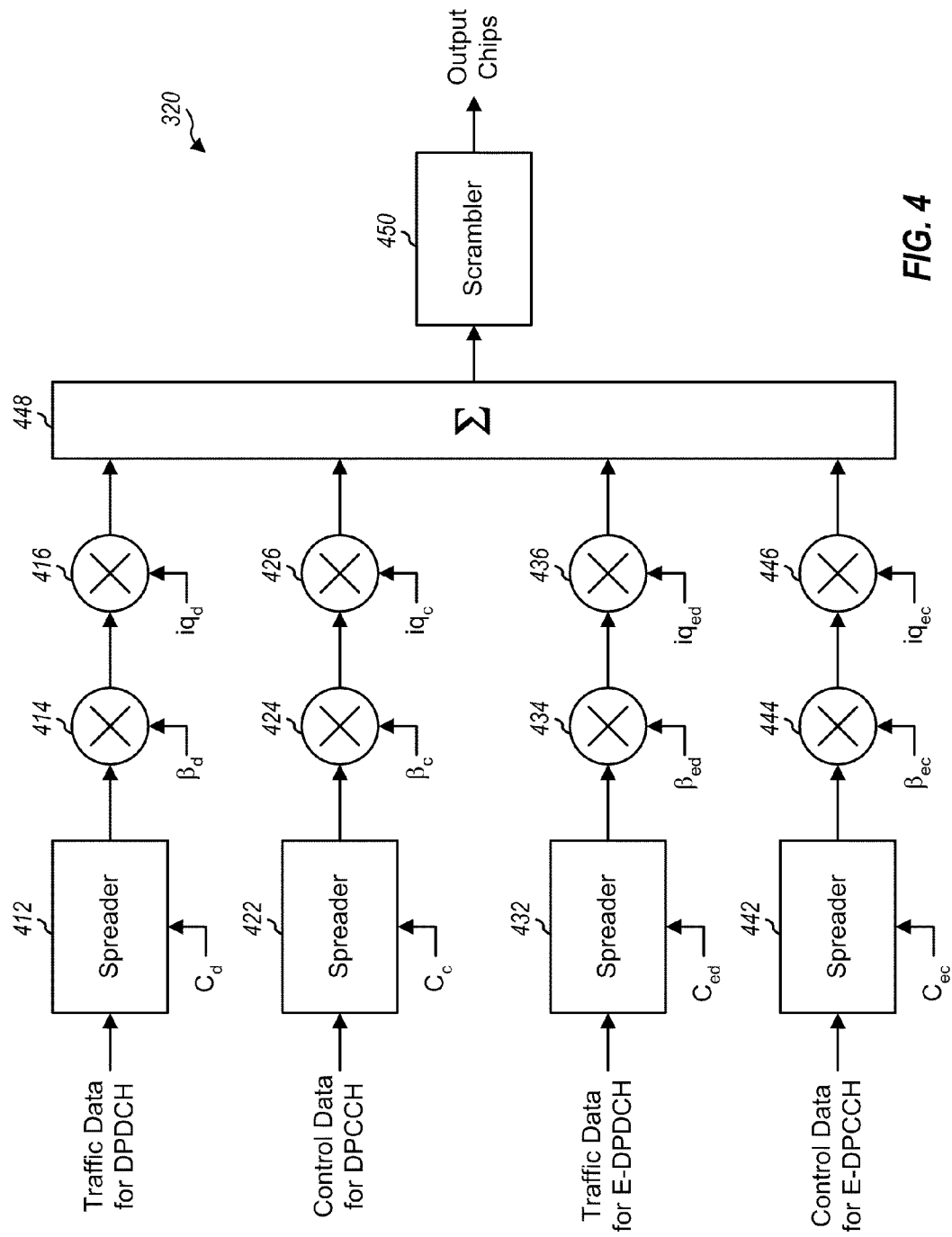
FIG. 4 shows a block diagram of a CDMA modulator at the terminal.

FIG. 4 shows a block diagram of CDMA modulator 320 at terminal 120. Within CDMA modulator 320, a spreader 412 spreads data symbols for the DPDCH with a channelization code $C_d$ and provides data chips. Spreader 412 repeats each data symbol to generate N replicated symbols, where N is the length of code $C_d$. Spreader 412 then multiplies the N replicated symbols with the N chips of code $C_a$ to generate N data chips for the data symbol. A multiplier 414 multiplies the output of spreader 412 with a gain factor $\beta_a$ for the DPDCH. A multiplier 416 multiplies the output of multiplier 414 with $iq_d$, which may be +1 or j, and provides chips for the DPDCH. A spreader 422 spreads pilot and control symbols for the DPCCH with a channelization code $C_c$. A multiplier 424 multiplies the output of spreader 422 with a gain factor $\beta_c$ for the DPCCH. A multiplier 426 multiplies the output of multiplier 424 with $iq_c = j$ and provides chips for DPCCH.

A spreader 432 spreads data symbols for the E-DPDCH with a channelization code $C_{ed}$. A multiplier 434 multiplies the output of spreader 432 with a gain factor $\beta_{ed}$ for the E-DPDCH. A multiplier 436 multiplies the output of multiplier 434 with $iq_{ed}$=+1 or j and provides chips for the E-DPDCH. A spreader 442 spreads control symbols for the E-DPCCH with a channelization code $C_{ec}$. A multiplier 444 multiplies the output of spreader 442 with a gain factor $\beta_{ec}$ for the E-DPCCH. A multiplier 446 multiplies the output of multiplier 444 with $iq_{ec}$=+1 and provides chips for the E-DPCCH.

A summer 448 sums the chips from multipliers 416, 426, 436 and 446 and provides complex-valued chips. A scrambler 450 multiplies the output of summer 448 with a scrambling code $S_{dpch,n}$ for terminal 120 and provides output chips.

In general, zero, one or more DPDCHs and zero, one or more E-DPDCHs may be sent on each of the inphase (I) and quadrature (Q) paths. Each DPDCH is spread with a different channelization code $C_d$ having a length of 4 to 256 chips, which correspond to 960 to 15 kbps, respectively. Each E-DPDCH is spread with a different channelization code $C_{ed}$ having a length of 2 or 4 chips, which correspond to 1920 or 960 kbps, respectively. The DPCCH is sent on the Q path and is spread with a 256-chip channelization code $C_c$. The DPCCH carries 10 symbols in each slot, and the pilot field may carry 3 to 8 pilot symbols. The E-DPCCH is sent on the I path and is spread with a 256-chip channelization code $C_{ec}$.

The gain factors $\beta_d$ and $\beta_{ed}$ determine the amount of transmit power to use for traffic data. The gain factors $\beta_c$ and $\beta_{ec}$ determine the amount of transmit power to use for pilot and control data. A traffic-to-pilot ratio (TtoP) is the ratio of traffic power to pilot power and may be given in units of decibel (dB) as: TtoP=$20 \cdot \log_{10}(\beta_d/\beta_c)$ or $20 \cdot \log_{10}(\beta_{ed}/\beta_{ec})$. The traffic-to-pilot ratio is typically selected to achieve good channel estimation performance and may range, e.g., from 0 to 20 dB.

Base station 110 may estimate the response of the uplink channel for terminal 120 based on pilot symbols and/or data symbols sent by the terminal Base station 110 may derive a pilot-based channel estimate with the pilot symbols, which may be sent using code division multiplexing as shown in FIG. 4. Base station 110 may derive a data-based channel estimate with the data symbols, e.g., after a packet has been successfully decoded.

In general, channel estimation performance is affected by two competing factors—noise suppression and channel tracking. For a slowly varying channel, it is desirable to derive a channel estimate with as many symbols as possible since the channel gains change slowly and the quality of the channel estimate typically improves by using more symbols. For a fast fading channel, it is desirable to derive a channel estimate with fewer symbols since channel variation limits the number of symbols that can be coherently combined. Similarly, it is desirable to derive a channel estimate with more symbols for a low SNR channel and with fewer symbols for a high SNR channel.

In an exemplary embodiment, channel estimates are derived with different channel estimation filters designed for different channel conditions. The channel conditions may be quantified by SNR, mobility, fading, and/or other factors, and may be explicitly or implicitly determined as described below.

The channel estimation filters may be implemented with various designs. In an exemplary embodiment, the channel estimation filters are implemented with finite impulse response (FIR) filters, as follows:

$$\tilde{H}_m(n,k) = \sum_{i=0}^{L_m-1} W_m(i,k) \cdot \hat{H}(n-i,k), \qquad \text{Eq (1)}$$

where
$\hat{H}(n,k)$ is an initial channel gain estimate for tap k in slot n,
$W_m(i,k)$ is a filter coefficient for tap k in slot i of channel estimation filter m,
$\tilde{H}_m(n,k)$ is a filtered channel gain estimate for tap k in slot n with filter m, and
$L_m$ is the length of filter m.

In another exemplary embodiment, the channel estimation filters are implemented with infinite impulse response (IIR) filters, as follows:

$$\tilde{H}_m(n,k) = \alpha_m \cdot \tilde{H}_m(n-1,k) + (1-\alpha_m) \cdot \hat{H}(n,k), \qquad \text{Eq (2)}$$

where $\alpha_m$ is a coefficient that determines the amount of averaging. A large value of $\alpha_m$ corresponds to more averaging, and a small value of $\alpha_m$ corresponds to less averaging. The channel estimation filters may also be implemented with other types of filters.

M different channel estimation filters may be defined for m=1, . . . , M, where M>1. For FIR filters, each channel estimation filter has a specific filter length $L_m$ and a specific set of filter coefficients $W_m(i,k)$. Different coefficients may be used for different taps, so that $W_m(i,k)$ is a function of tap index k. Alternatively, the same coefficient may be used for all taps, so that $W_m(i)$ is not a function of tap index k. For IIR filters, each channel estimation filter has a different coefficient $\alpha_m$.

In general, any number of channel estimation filters may be defined for any channel conditions. In an exemplary embodiment, two channel estimation filters are implemented with FIR filters. The first filter has a length of two slots and the same coefficient for both slots, or $L_1$=2 and $W_1(0,k)=W_1(1,k)$. The second filter has a length of three or four slots and different coefficients for the slots. The first filter may be used for high SNR, high mobility, and/or fast fading. The second filter may be used for low SNR, low mobility, and/or slow fading.

In an exemplary embodiment, a suitable channel estimation filter is selected from among all available channel estimation filters based on a filter selection metric. This metric may relate to SNR, mobility, fading, and/or other factors. In an exemplary embodiment, the metric indicates whether a channel estimate is derived based on pilot symbols or data symbols. In another exemplary embodiment, the metric corresponds to the traffic-to-pilot ratio. A power control mechanism may adjust the transmit power such that the pilot SNR is maintained at a target SNR, which may be −20 dB or some other value. The data SNR may be determined based on the pilot SNR and the traffic-to-pilot ratio. In yet another exemplary embodiment, the metric corresponds to a packet format selected for use. Different packet formats may be associated with different code rates and/or modulation schemes and may require different SNRs for reliable decoding. In yet another exemplary embodiment, the metric corresponds to an SNR determined based on received pilot symbols and/or received data symbols. In yet another exemplary embodiment, the metric relates to mobility (or Doppler spread), which may be estimated with pilot correlation or in some other manners known in the art. The metric may also be defined in other manners.

Figure 5:
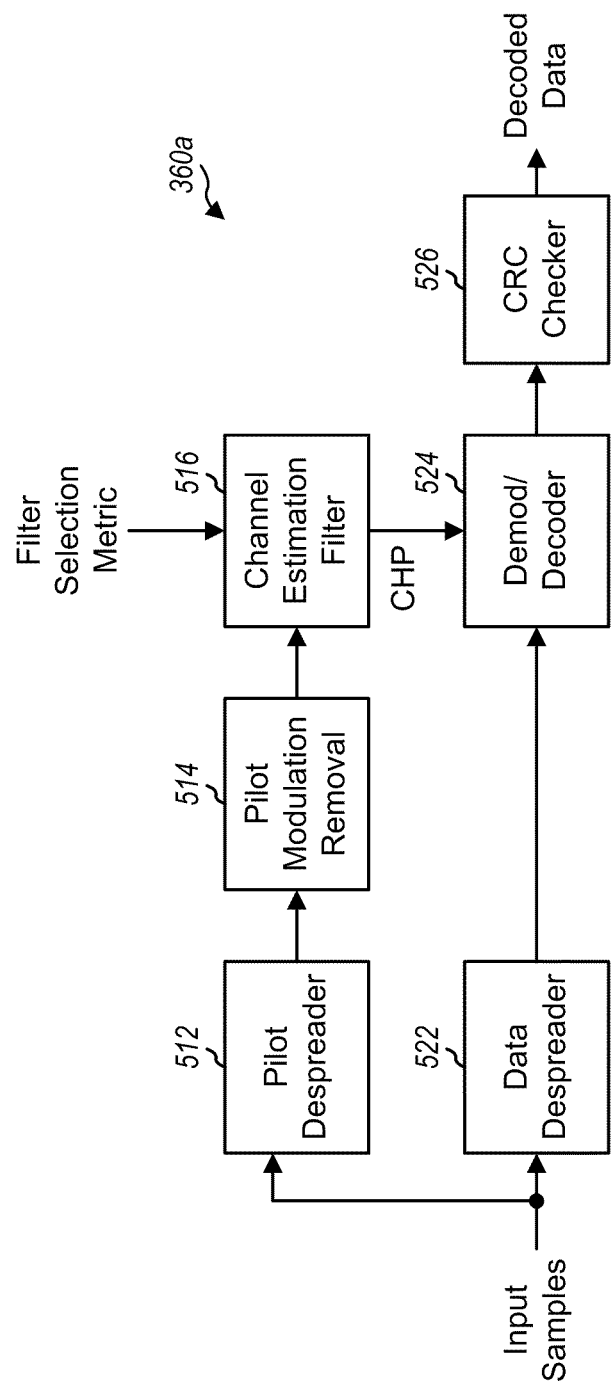
FIG. 5 shows a block diagram of a receive (RX) processor at the base station.

FIG. 5 shows a block diagram of an RX processor 360a, which is an exemplary embodiment of RX processor 360 in FIG. 3. Within RX processor 360a, a pilot despreader 512 despreads the input samples (e.g., with channelization code $C_c$ for the DPCCH) and provides despread pilot symbols. A unit 514 removes the modulation on the despread pilot symbols and provides channel gain estimates. A channel estimation filter 516 receives the channel gain estimates and a filter selection metric. Filter 516 selects a suitable filter from among all possible filters based on the metric. Filter 516 then filters the channel gain estimates with the selected filter, e.g., as shown in equation (1) or (2), and provides a pilot-based channel estimate, CHP.

A data despreader 522 despreads the input samples (e.g., with channelization code $C_d$ for the DPDCH or channelization code $C_{ed}$ for the E-DPDCH) and provides despread data symbols. A demodulator/decoder 524 performs data detection on the despread data symbols with the pilot-based channel estimate to obtain detected symbols. Unit 524 further deinterleaves and decodes the detected symbols to obtain decoded data. A CRC checker 526 checks each decoded packet and determines whether the packet is decoded correctly or in error.

Figure 6:
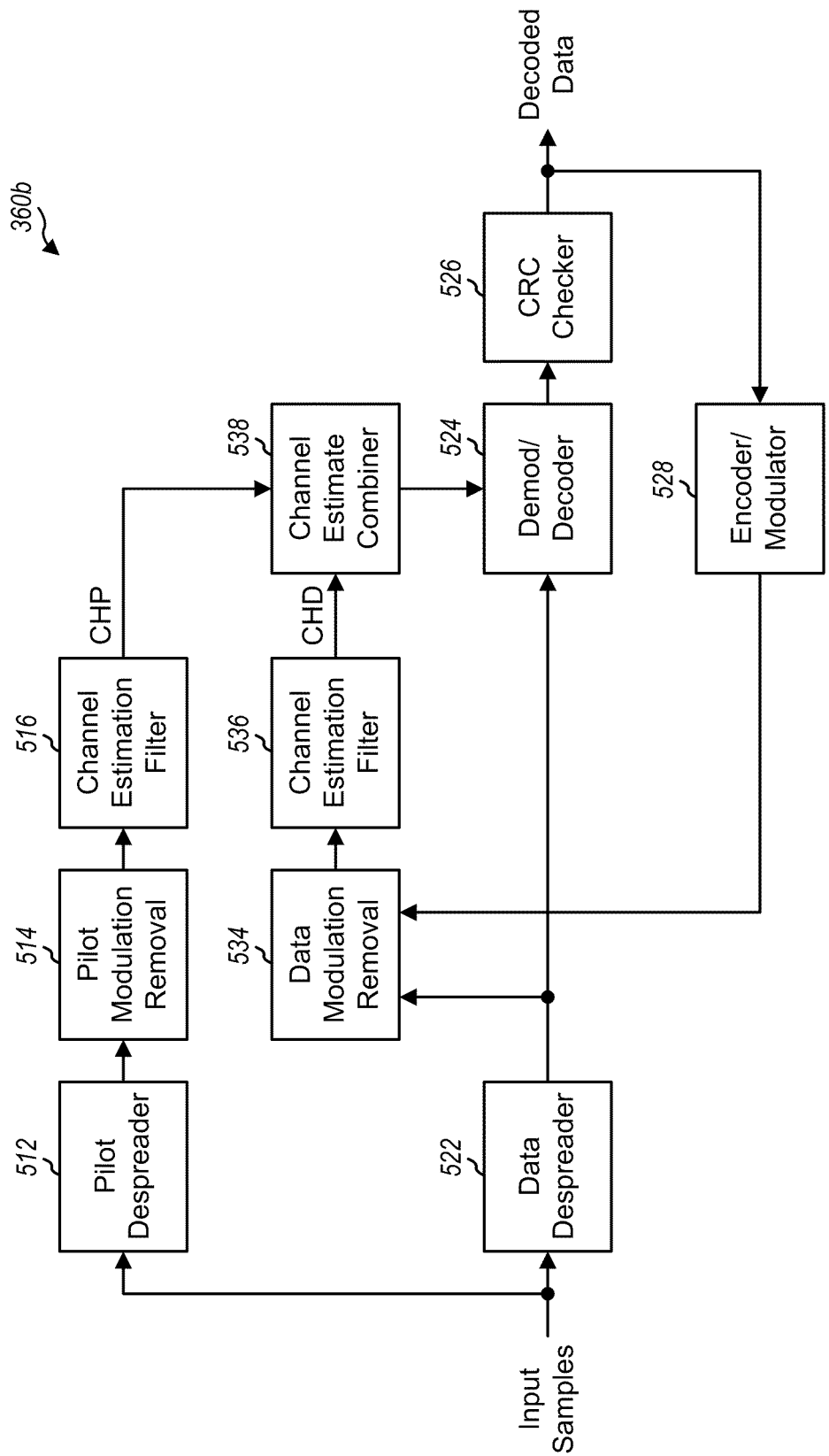
FIG. 6 shows a block diagram of an RX processor with different channel estimation filters for pilot and data symbols.

FIG. 6 shows a block diagram of an RX processor 360b, which is another exemplary embodiment of RX processor 360 in FIG. 3. RX processor 360b includes despreaders 512 and 522, pilot modulation removal unit 514, channel estimation filter 516, demodulator/decoder 524, and CRC checker 526, which operate as described above for FIG. 5.

If a packet is decoded correctly, then an encoder/modulator 528 processes (e.g., encodes, interleaves, and modulates) the decoded packet in the same manner as terminal 120 and provides regenerated data symbols. A unit 534 removes the modulation on the despread data symbols with the regenerated data symbols and provides data-based channel gain estimates $\hat{H}_d(n,k)$. A channel estimation filter 536 filters the channel gain estimates $\hat{H}_d(n,k)$ and provides a data-based channel estimate, CHD. The channel gain estimates $\hat{H}_d(n,k)$ from unit 534 may be derived from many data symbols that have been correctly decoded and re-encoded and may thus be more reliable than the pilot-based channel gain estimates $\hat{H}_p(n,k)$ from unit 514. Hence, filter 536 may implement a filter that can provide good performance for high SNR.

A combiner 538 receives the pilot-based channel estimate CHP from filter 516 and the data-based channel estimate CHD from filter 536. Combiner 538 may select one of the two channel estimates or may combine the two channel estimates. Combiner 538 may provide the data-based channel estimate if certain criteria are satisfied and may provide the pilot-based channel estimate otherwise. For example, combiner 538 may provide the data-based channel estimate if it is available and not stale (e.g., obtained within a predetermined number of slots), if the traffic-to-pilot ratio is above a particular threshold, and so on. Combiner 538 may also combine the pilot-based and data-based channel estimates, e.g., if the traffic-to-pilot ratio is within a particular range, and may disable combining otherwise. A decision on whether to combine or not combine may be made based on the qualities of the two channel estimates, which may be inferred from the traffic-to-pilot ratio. Good performance may be achieved by combining the channel estimates if their SNRs are similar and by using the better channel estimate if their SNRs are sufficiently different. Combiner 538 may weigh the pilot-based and data-based channel estimates (e.g., based on the SNRs of these channel estimates) and then combine the weighted channel estimates. Combiner 538 may also perform unweighted averaging of the pilot-based and data-based channel estimates. In any case, combiner 538 provides a channel estimate for demodulator/decoder 524.

Base station 110 may receive uplink transmissions from multiple terminals. In an exemplary embodiment, base station 110 processes the input samples from receiver 354 independently for each terminal, e.g., as shown in FIG. 5 or 6, to recover the uplink transmission from that terminal In this exemplary embodiment, the uplink transmission from each terminal acts as interference to the other terminals.

In another exemplary embodiment, base station 110 recovers the uplink transmissions using interference cancellation. In this exemplary embodiment, base station 110 processes the input samples from receiver 354 to recover the uplink transmission from one terminal, estimates the interference due to this terminal, and subtracts the interference from the input samples to obtain input samples for the next terminal Base station 110 may recover the uplink transmission from each remaining terminal in the same manner. By removing the interference from terminals that are successfully decoded, higher SNRs may be achieved for terminals that are recovered later.

Figure 7:
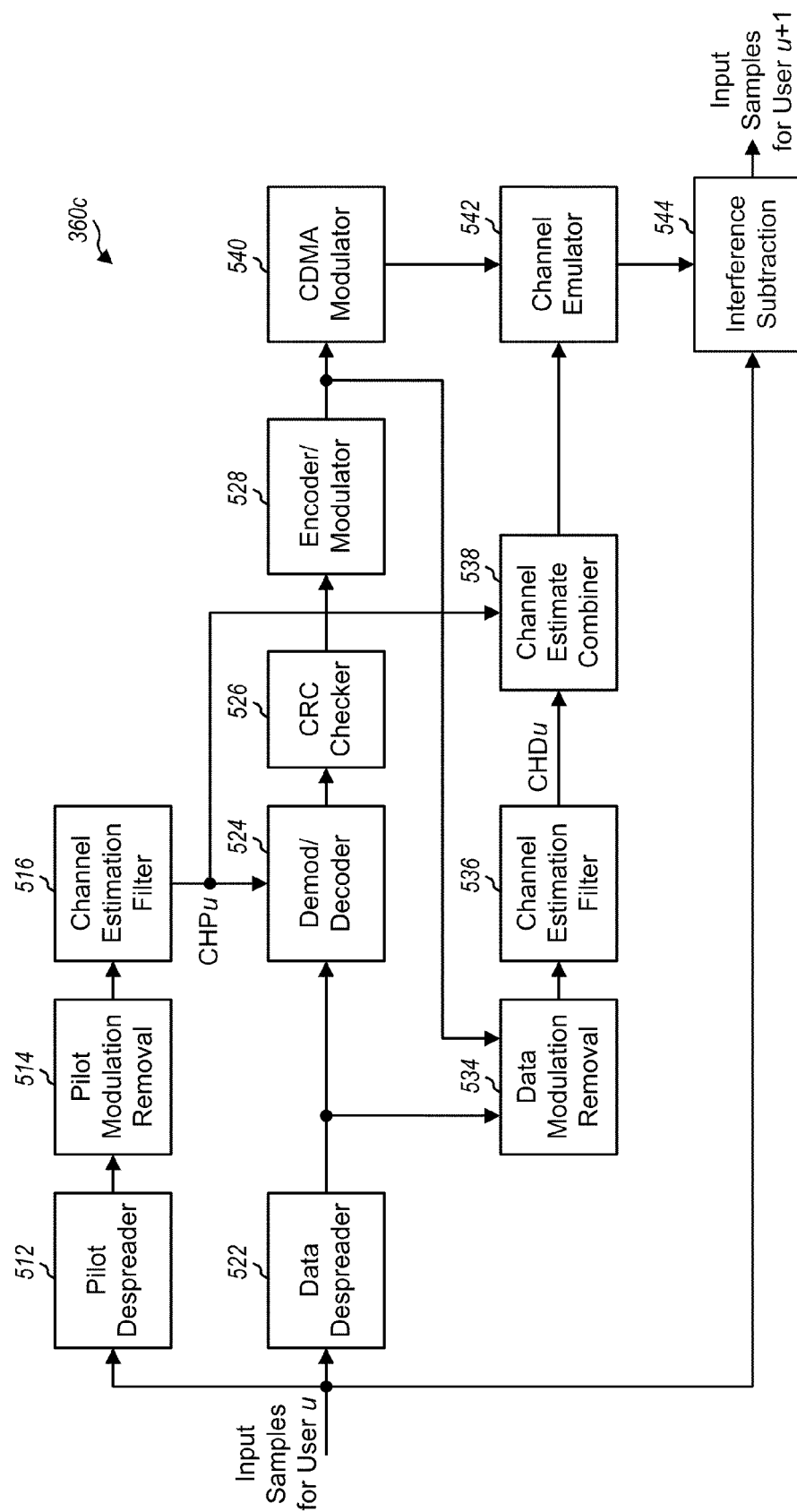
FIG. 7 shows a block diagram of an RX processor with interference cancellation.

FIG. 7 shows a block diagram of an RX processor 360c, which performs interference cancellation and is yet another exemplary embodiment of RX processor 360 in FIG. 3. RX processor 360c includes despreaders 512 and 522, modulation removal units 514 and 534, channel estimation filters 516 and 536, combiner 538, demodulator/decoder 524, CRC checker 526, and encoder/modulator 528, which operate as described above for FIG. 6 except for the following differences. First, despreaders 512 and 522 receive input samples for terminal u. These input samples may or may not be the input samples from receiver 354 depending on whether or not terminal u is the first terminal being recovered. Second, channel estimation filter 516 (instead of combiner 538) provides a pilot-based channel estimate, CHPu, for terminal u to demodulator/decoder 524. Third, channel estimation filter 536 provides a data-based channel estimate, CHDu, for terminal u.

If a packet is decoded correctly for terminal u, then encoder/modulator 528 processes the decoded packet and provides regenerated data symbols for terminal u. A CDMA modulator 540 then spreads and scrambles the regenerated data symbols (and possibly pilot and control symbols) and generates output chips for terminal u. A channel emulator 542 receives the output chips from CDMA modulator 540 and a channel estimate from combiner 538, convolves the output chips with the channel estimate, and provides an interference estimate for terminal u. Channel emulator 542 simulates the effects of the wireless channel for terminal u. An interference subtraction unit 544 subtracts the interference estimate from the input samples for terminal u and provides input samples for the next terminal u+1.

In the exemplary embodiment shown in FIG. 7, the data-based channel estimate CHDu from filter 536 is used to derive an interference estimate for terminal u. The data-based channel estimate may also be used for demodulation and decoding for terminal u in similar manner as shown in FIG. 6. For example, whenever a packet is decoded correctly, the data-based channel estimate is derived from the regenerated data symbols for this packet and used for interference estimation for the present packet as well as demodulation/decoding for the next packet.

Combiner 538 may combine pilot-based and data-based channel estimates using any of the criteria described above for FIG. 6 and/or other criteria applicable for interference cancellation. For example, combiner 538 may provide the pilot-based channel estimate for the first stage or the first few stages. Combiner 538 may provide the data-based channel estimate or may combine the pilot-based and data-based channel estimates for the remaining stages.

FIG. 7 shows the processing for one terminal in one stage. U terminals may be processed sequentially in U stages, one terminal in each stage. The first stage processes the input samples from receiver 354 for the first terminal and provides input samples for the second stage. Each subsequent stage processes the input samples from a preceding stage for one terminal and provides input samples for the next stage.

The terminals may also be processed with parallel interference cancellation. In this case, all terminals may be processed in the first round. The interference from all terminals successfully decoded in the first round may be estimated and subtracted from the input samples. Terminals not successfully decoded in the first round may then be processed again using the interference-canceled input samples. The processing may continue until all terminals are successfully decoded or the interference from all successfully decoded terminals has been canceled. A combination of sequential and parallel interference cancellation may also be performed. In this case, the terminals may be arranged into groups, e.g., based on their SNRs. The groups may be processed sequentially, and the terminals in each group may be processed in parallel.

With interference cancellation, the SNR of each terminal is dependent on the stage/order in which the terminal is recovered. The SNR of the first terminal may be the worst since no interference has been removed. The SNR of the next terminal may be better since the interference from the first terminal has been removed. The SNR of the last terminal may be the best since the interference from all prior terminals have been removed. In general, SNR progressively improves the later a terminal is recovered.

A large variation in SNRs may be present in the symbols used to derive channel estimates. The large SNR variation may result from interference cancellation and/or from using different types of symbols, e.g., pilot symbols and data symbols, for channel estimation. The channel estimation filtering may be matched to the variation in SNRs to obtain higher quality channel estimates.

The channel estimation filters for each terminal may be selected based on the SNR for that terminal, which may be dependent on the stage/order in which the terminal is recovered as well as where within the stage the filters are used. For the first terminal with the worst SNR, channel estimation filter 516 may be for low SNR, and channel estimation filter 536 may be for low or medium SNR. For each subsequent terminal, filters 516 and 536 may be for progressively higher SNR. In general, filter 516 for successively later stages may be for progressively higher SNR. Filter 536 for successively later stages may also be for progressively higher SNR. For any given stage, filter 536 may be for higher SNR than filter 516. The particular filters to use for each stage may be appropriately selected from among all channel estimation filters available for use.

The channel estimation techniques described herein may also be used for data sent with hybrid automatic repeat request (H-ARQ). With H-ARQ, a transmitter sends one or multiple transmissions for a packet until the packet is decoded correctly by a receiver or the maximum number of transmissions has been sent for the packet. H-ARQ improves reliability for data transmission and supports rate adaptation for packets in the presence of changes in channel conditions. For a packet sent with H-ARQ, demodulator/decoder 524 may store all transmissions for the packet, combine the stored transmissions with a current transmission, and demodulate and decode the combined transmission to recover the packet. Different channel estimation filters may be used for different transmissions of a given packet, which may be associated with different SNRs.

The channel estimation techniques described herein may be used for single-input single-output (SISO), single-input multiple-output (SIMO), multiple-input single-output (MISO), and multiple-input multiple-output (MIMO) transmissions. Single-input refers to the use of a single transmit antenna, and multiple-input refers to the use of multiple transmit antennas for data transmission. Single-output refers to the use of a single receive antenna, and multiple-output refers to the use of multiple receive antennas for data reception.

Figure 8:
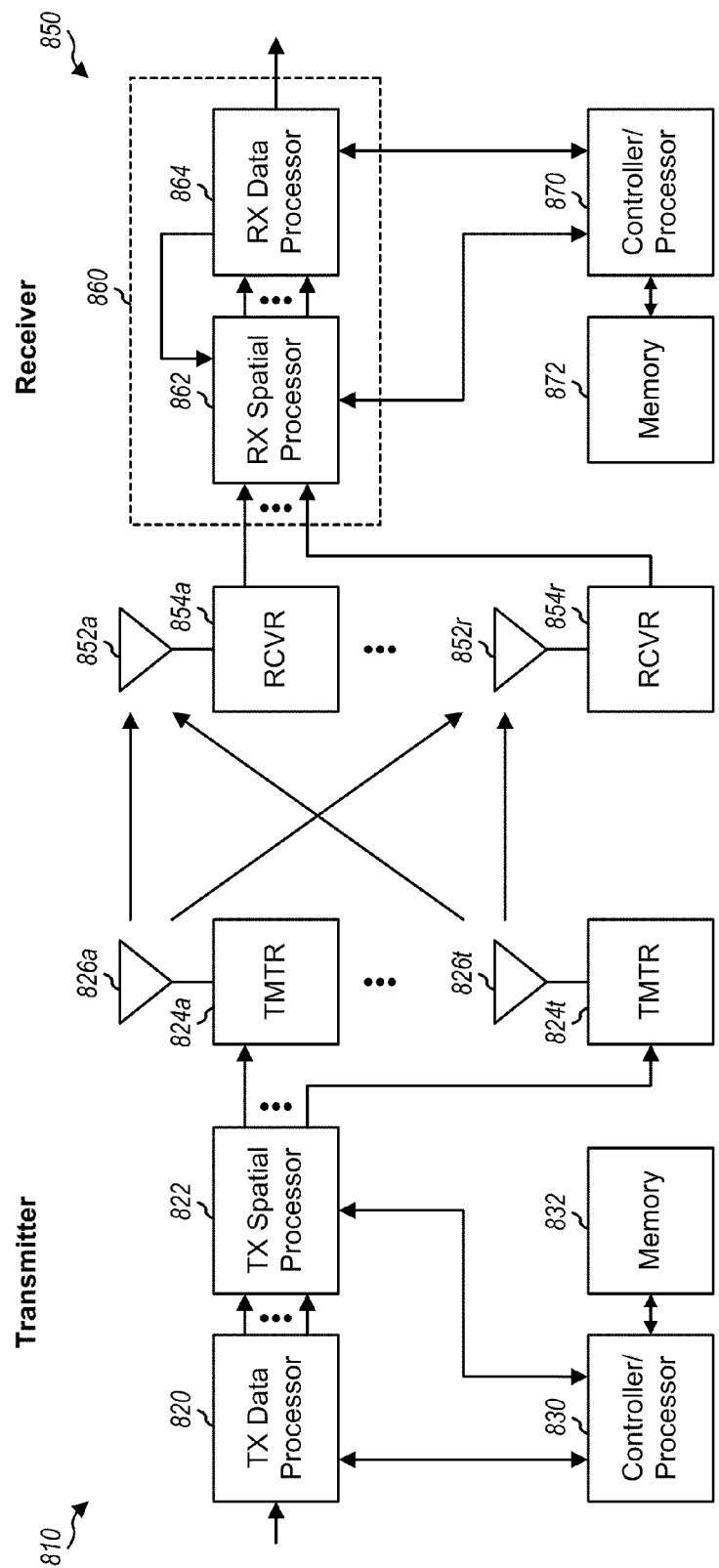
FIG. 8 shows a block diagram of a transmitter and a receiver for a MIMO transmission.

FIG. 8 shows a block diagram of a transmitter 810 and a receiver 850 for MIMO transmission. For downlink transmission, transmitter 810 may be part of base station 110, and receiver 850 may be part of terminal 120. For uplink transmission, transmitter 810 may be part of terminal 120, and receiver 850 may be part of base station 110. Transmitter 110 is equipped with multiple (T) transmit antennas. Receiver 850 is equipped with multiple (R) receive antennas.

At transmitter 810, a TX data processor 820 processes data packets and generates S streams of data symbols, where $1 \leq S \leq \min\{T, R\}$. Each packet may be sent in one stream or across multiple streams. A TX spatial processor 822 multiplexes pilot symbols with the data symbols, performs spatial mapping on the multiplexed symbols, and provides T output chip streams to T transmitters 824a through 824t. Each transmitter 824 processes its output chip stream and generates a modulated signal. T modulated signals from transmitters 824a through 824t are transmitted from antennas 826a through 826t, respectively.

At receiver 850, R antennas 852a through 852r receive the modulated signals from transmitter 810, and each antenna 852 provides a received signal to a respective receiver 854. Each receiver 854 processes its received signal and provides input samples. Within an RX processor 860, an RX spatial processor 862 performs MIMO detection on the input samples and provides detected symbols. An RX data processor 864 further processes (e.g., deinterleaves and decodes) the detected symbols and provides decoded packets.

Controllers/processors 830 and 870 control the operation at transmitter 810 and receiver 850, respectively. Memories 832 and 872 store data and program codes for transmitter 810 and receiver 850, respectively.

Figure 9:
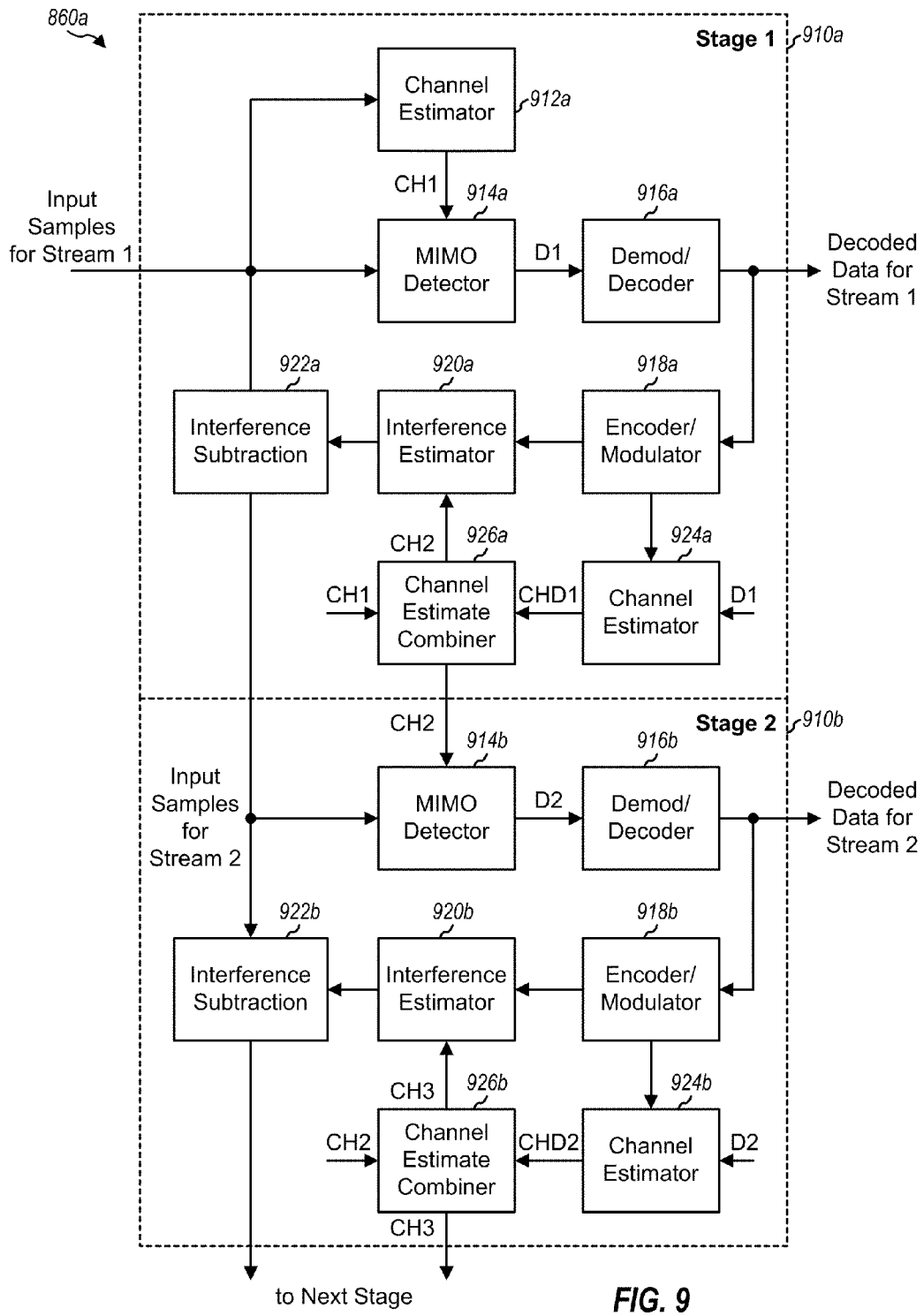
FIG. 9 shows a block diagram of an RX processor with interference cancellation.

FIG. 9 shows a block diagram of an RX processor 860a, which is an exemplary embodiment of RX processor 860 in FIG. 8. RX processor 860a recovers the transmissions from transmitter 810 with successive interference cancellation (SIC).

For the first stage 910a, a channel estimator 912a derives a channel estimate CH1, e.g., based on pilot symbols. A MIMO detectors 914a performs MIMO detection on the R streams of input samples from receivers 854a through 854r and provides detected symbols D1 for the first data stream being recovered. MIMO detectors 914a may implement zero-forcing (ZF), minimum mean square error (MMSE), or some other MIMO detection scheme. A demodulator/decoder 916a demodulates, deinterleaves and decodes the detected symbols to obtain a decoded packet and further determines whether the packet is decoded correctly or in error.

If the packet is decoded correctly, then an encoder/modulator 918a encodes, interleaves and modulates the packet to regenerate the data symbols. A channel estimator 924a derives a data-based channel estimate CHD1 based on the regenerated data symbols and the detected symbols D1. A combiner 926a selectively combines the channel estimate CH1 from channel estimator 912a and the data-based channel estimate CHD1 from channel estimator 924a and provides a channel estimate CH2. An interference estimator 920a estimates the interference due to the decoded packet based on the regenerated data symbols and the channel estimate CH2. An interference subtraction unit 922a subtracts the interference estimate from the input samples and provides input samples for the next stage.

Each subsequent stage may perform processing on the input samples for that stage with the channel estimate from the prior stage, in similar manner as the first stage. Each stage provides input samples and channel estimate for the next stage.

The SNR generally improves for later stages. Different channel estimation filters may be used for channel estimators 912 and/or 924 in different stages and may be selected based on the SNRs for these stages. In general, filter 924 for successively later stages may be for progressively higher SNR. The particular filter to use for each stage may be appropriately selected from among all channel estimation filters available for use.

Figure 10:
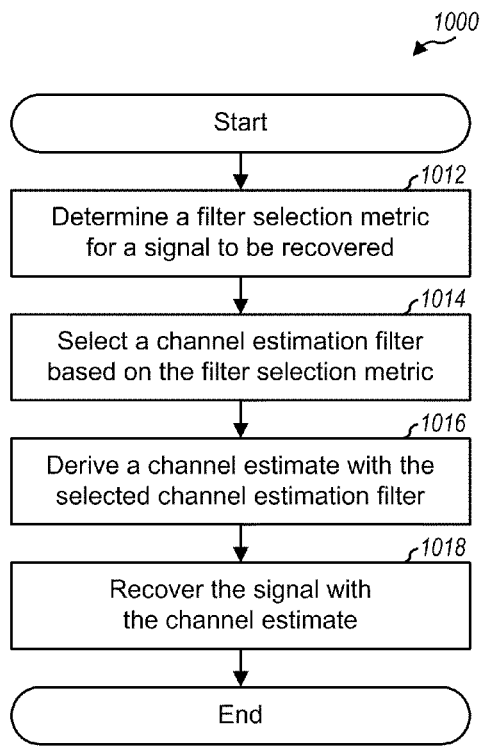
FIG. 10 shows a process for recovering a signal.

FIG. 10 shows an exemplary embodiment of a process 1000 for recovering a signal with a selectable channel estimation filter. A filter selection metric is determined for a signal to be recovered (block 1012). The filter selection metric may be determined based on whether pilot symbols or data symbols are used to derive a channel estimate, a traffic-to-pilot ratio for the signal, an order in which the signal is recovered among multiple signals to be recovered, an SNR of the signal, mobility, and/or other information. A channel estimation filter is selected based on the filter selection metric (block 1014). Multiple channel estimation filters with different lengths and/or frequency responses may be available, e.g., for different SNR ranges. A suitable channel estimation filter may be selected, e.g., based on the SNR explicitly or implicitly indicated by the filter selection metric. A channel estimate is derived with the selected channel estimation filter (block 1016). The signal is then recovered with the channel estimate (block 1018).

Figure 11:
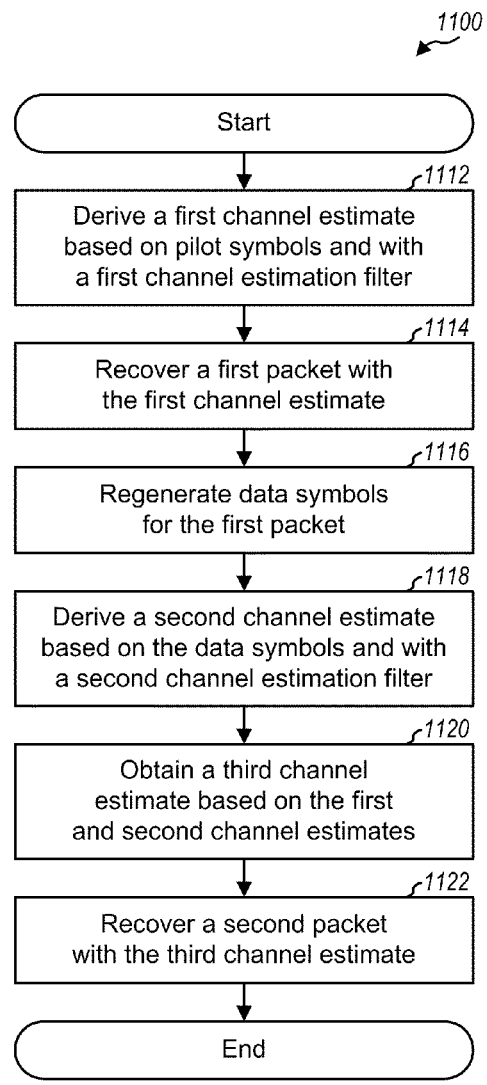
FIG. 11 shows a process for recovering a signal with different channel estimates.

FIG. 11 shows an exemplary embodiment of a process 1100 for recovering a signal with different channel estimates. A first channel estimate is derived based on pilot symbols and with a first channel estimation filter (block 1112). A first packet is recovered with the first channel estimate (block 1114). Data symbols for the first packet are regenerated (block 1116). A second channel estimate is derived based on the data symbols and with a second channel estimation filter (block 1118). A third channel estimate is obtained based on the first and second channel estimates (block 1120). The second channel estimate may be provided as the third channel estimate, e.g., if the quality of the second channel estimate exceeds the quality of the first channel estimate by a predetermined amount, which may be determined by a traffic-to-pilot ratio. The first and second channel estimates may also be combined, with or without weighting, and provided as the third channel estimate. In any case, a second packet is recovered with the third channel estimate (block 1122).

Figure 12:
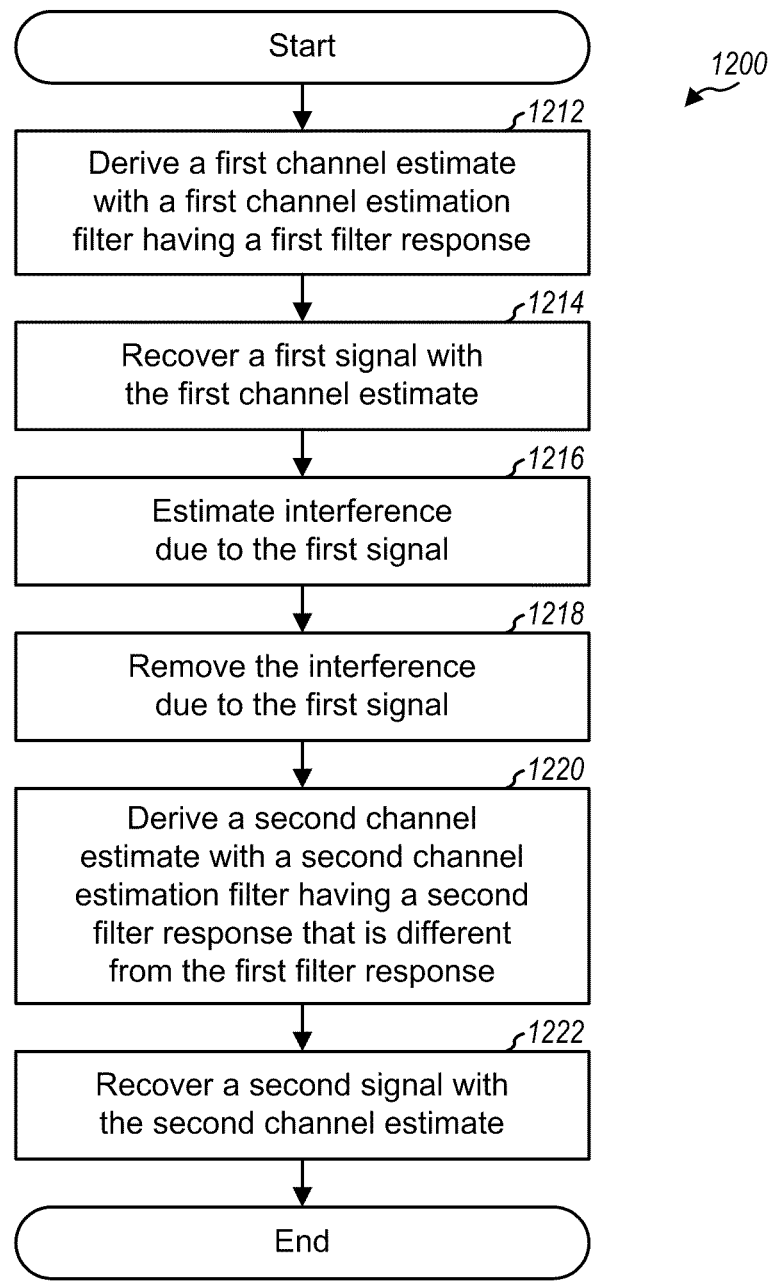
FIG. 12 shows a process for recovering multiple signals.

FIG. 12 shows an exemplary embodiment of a process 1200 for recovering multiple signals. A first channel estimate is derived with a first channel estimation filter having a first filter response (block 1212). A first signal is recovered with the first channel estimate (block 1214). Interference due to the first signal is estimated (block 1216) and removed (block 1218). A second channel estimate is derived with a second channel estimation filter having a second filter response that is different from the first filter response (block 1220). A second signal is recovered with the second channel estimate (block 1222).

For block 1216, the first signal may be regenerated. A third channel estimate may be derived based on the regenerated first signal and with a third channel estimation filter having a third filter response that is different from the first filter response. A fourth channel estimate may be obtained based on the first and third channel estimates, e.g., by (1) combining the first and third channel estimates if a traffic-to-pilot ratio is within a particular range or (2) providing the first or third channel estimate as the fourth channel estimate otherwise. The interference due to the first signal may be derived with the fourth channel estimate.

Additional signals may be recovered in similar manner as the second signal. The signals may be from different transmitters, e.g., different terminals. The signals may also correspond to different data streams in a MIMO transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the exemplary embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is in communication with (e.g., coupled to) the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other exemplary embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. An apparatus, comprising:
at least one processor operable to:
generate a first channel estimate using a first channel estimation filter having a first filter response;
recover a first signal using the first channel estimate;
regenerate the first signal after recovering the first signal;
generate a second channel estimate based on the regenerated first signal and using a second channel estimation filter having a second filter response that is different from the first filter response; and
in response to detecting a traffic to pilot ratio in a particular range, combine the first channel estimate and the second channel estimate to obtain a third channel estimate; and
a memory in communication with the at least one processor.

2. The apparatus of claim 1, wherein the at least one processor is further operable to provide the first channel estimate or the second channel estimate as the third channel estimate in response to detecting that the traffic to pilot ratio is outside the particular range.

3. The apparatus of claim 1, wherein the at least one processor is further operable to determine a quality of the first channel estimate.

4. The apparatus of claim 3, wherein the at least one processor is further operable to determine a quality of the second channel estimate.

5. The apparatus of claim 1, wherein the at least one processor is further operable to:
estimate interference due to the first signal; and
remove the estimated interference due to the first signal.

6. The apparatus of claim 5, wherein the at least one processor is further operable to estimate the interference due to the first signal based on the third channel estimate.

7. The apparatus of claim 1, wherein the at least one processor is further operable to:
generate a fourth channel estimate using a third channel estimation filter having a third filter response that is different from the first filter response;
recover a second signal using the fourth channel estimate;
estimate interference due to the second signal; and
remove the estimated interference due to the second signal.

8. The apparatus of claim 7, wherein the first signal is received from a first mobile terminal, and wherein the second signal is received from a second mobile terminal.

9. The apparatus of claim 7, wherein the first signal and the second signal correspond to a multiple-input multiple-output (MIMO) transmission.

10. The apparatus of claim 1, wherein the at least one processor and the memory are integrated within a base station.

11. A computer-implemented method, comprising:
generating, at a computing device, a first channel estimate using a first channel estimation filter having a first filter response;
recovering a first signal using the first channel estimate;
regenerating the first signal after recovering the first signal;
generating, at the computing device, a second channel estimate based on the regenerated first signal and using a second channel estimation filter having a second filter response that is different from the first filter response; and
in response to detecting a traffic to pilot ratio in a particular range, combining the first channel estimate and the second channel estimate to obtain a third channel estimate.

12. The computer-implemented method of claim 11, further comprising providing the first channel estimate or the second channel estimate as the third channel estimate in response to detecting that the traffic to pilot ratio is outside the particular range.

13. The computer-implemented method of claim 11, further comprising determining a quality of the first channel estimate.

14. The computer-implemented method of claim 13, further comprising determining a quality of the second channel estimate.

15. The computer-implemented method of claim 11, further comprising:
estimating interference due to the first signal; and
removing the estimated interference due to the first signal.

16. The computer-implemented method of claim 15, wherein the interference due to the first signal is estimated based on the third channel estimate.

17. The computer-implemented method of claim 11, further comprising:
generating a fourth channel estimate using a third channel estimation filter having a third filter response that is different from the first filter response;
recovering a second signal using the fourth channel estimate;
estimating interference due to the second signal; and
removing the estimated interference due to the second signal.

18. The computer-implemented method of claim 17, wherein the first signal is received from a first mobile terminal, and wherein the second signal is received from a second mobile terminal.

19. The computer-implemented method of claim 17, wherein the first signal and the second signal correspond to a multiple-input multiple-output (MIMO) transmission.

20. The computer-implemented method of claim 11, further comprising receiving, at a base station, the first signal.

21. An apparatus, comprising:
means for generating a first channel estimate using a first channel estimation filter having a first filter response;
means for recovering a first signal using the first channel estimate;
means for regenerating the first signal after recovering the first signal;
means for generating a second channel estimate based on the regenerated first signal and using a second channel estimation filter having a second filter response that is different from the first filter response; and
means for combining the first channel estimate and the second channel estimate to obtain a third channel estimate in response to detecting a traffic to pilot ratio within a particular range.

22. The apparatus of claim 21, further comprising means for providing the first channel estimate or the second channel estimate as the third channel estimate in response to detecting that the traffic to pilot ratio is outside the particular range.

23. The apparatus of claim 21, further comprising means for determining a quality of the first channel estimate.

24. The apparatus of claim 23, further comprising means for determining a quality of the second channel estimate.

25. The apparatus of claim 21, further comprising:
means for estimating interference due to the first signal; and
means for removing the estimated interference due to the first signal.

26. The apparatus of claim 25, wherein the means for estimating the interference due to the first signal estimates the interference due to the first signal based on the third channel estimate.

27. The apparatus of claim 21, further comprising:
means for generating a fourth channel estimate using a third channel estimation filter having a third filter response that is different from the first filter response;
means for recovering a second signal using the fourth channel estimate;
means for estimating interference due to the second signal; and
means for removing the estimated interference due to the second signal.

28. The apparatus of claim 27, wherein the first signal and the second signal correspond to a multiple-input multiple-output (MIMO) transmission.

29. The apparatus of claim 27, wherein the first signal is received from a first mobile terminal, and wherein the second signal is received from a second mobile terminal.

30. The apparatus of claim 29, wherein the first signal and the second signal are received at a base station.

31. A non-transitory computer-readable storage medium comprising instructions that, when executed by a computer, cause the computer to:
generate a first channel estimate using a first channel estimation filter having a first filter response;
recover a first signal using the first channel estimate;
regenerate the first signal after recovering the first signal;
generate a second channel estimate based on the regenerated first signal and using a second channel estimation filter having a second filter response that is different from the first filter response; and
in response to detecting a traffic to pilot ratio in a particular range, combine the first channel estimate and the second channel estimate to obtain a third channel estimate.

32. The non-transitory computer-readable storage medium of claim 31, wherein the instructions are further operable to cause the computer to provide the first channel estimate or the second channel estimate as the third channel estimate in response to detecting that the traffic to pilot ratio is outside the particular range.

33. The non-transitory computer-readable storage medium of claim 31, wherein the instructions are further operable to cause the computer to determine a quality of the first channel estimate.

34. The non-transitory computer-readable storage medium of claim 33, wherein the instructions are further operable to cause the computer to determine a quality of the second channel estimate.

35. The non-transitory computer-readable storage medium of claim 31, wherein the instructions are further operable to cause the computer to:
estimate interference due to the first signal; and
remove the estimated interference due to the first signal.

36. The non-transitory computer-readable storage medium of claim 35, wherein the interference due to the first signal is estimated based on the third channel estimate.

37. The non-transitory computer-readable storage medium of claim 31, wherein the instructions are further operable to cause the computer to:
generate a fourth channel estimate using a third channel estimation filter having a third filter response that is different from the first filter response;
recover a second signal using the fourth channel estimate;
estimate interference due to the second signal; and
remove the estimated interference due to the second signal.

38. The non-transitory computer-readable storage medium of claim 37, wherein the first signal is received from a first mobile terminal, and wherein the second signal is received from a second mobile terminal.

39. The non-transitory computer-readable storage medium of claim 37, wherein the first signal and the second signal correspond to a multiple-input multiple-output (MIMO) transmission.

40. The non-transitory computer-readable storage medium of claim 31, wherein the computer is integrated into a base station.

* * * * *